(12) United States Patent
Kusakabe et al.

(10) Patent No.: US 7,491,459 B2
(45) Date of Patent: Feb. 17, 2009

(54) POLYMER ELECTROLYTE FUEL CELL

(75) Inventors: Hiroki Kusakabe, Sakai (JP); Kazuhito Hatoh, Osaka (JP); Hideo Ohara, Katano (JP); Shinsuke Takeguchi, Osaka (JP); Soichi Shibata, Hirakata (JP); Takeshi Tomizawa, Ikoma (JP); Toshihiro Matsumoto, Takatsuki (JP); Eiichi Yasumoto, Soraku-gun (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 11/344,095

(22) Filed: Feb. 1, 2006

(65) Prior Publication Data

US 2006/0127724 A1    Jun. 15, 2006

Related U.S. Application Data

(62) Division of application No. 10/873,652, filed on Jun. 23, 2004.

(30) Foreign Application Priority Data

Jun. 24, 2003   (JP)   ............... 2003-179577

(51) Int. Cl.
  *H01M 8/10* (2006.01)
  *H01M 8/04* (2006.01)
  *H01M 8/02* (2006.01)
(52) U.S. Cl. .............. 429/30; 429/26; 429/38; 429/13; 429/17; 429/20; 429/32; 429/34; 429/39
(58) Field of Classification Search ............... 429/30, 429/26, 38, 13, 17, 20, 32, 34, 39
See application file for complete search history.

(56) References Cited

U.S. PATENT DOCUMENTS 5,230,966 A   7/1993   Voss et al.
5,922,485 A * 7/1999  Enami .................. 429/26
6,042,955 A   3/2000   Okamoto
6,124,051 A   9/2000   Johnson (Continued)

FOREIGN PATENT DOCUMENTS

| JP | 11233126    | 8/1999 |
| JP | 2001 068131 | 3/2001 |
| JP | 2002/184428 | 6/2002 |

OTHER PUBLICATIONS

Korean Office Action dated Jan. 21, 2006.

(Continued)

*Primary Examiner*—Dah-Wei Yuan
*Assistant Examiner*—Angela Martin
(74) *Attorney, Agent, or Firm*—Dickinson Wright, PLLC

(57) ABSTRACT

The polymer electrolyte fuel cell of the present invention is equipped with a cell having an MEA having a hydrogen ion-conducting polymer electrolyte membrane and an anode and a cathode sandwiching the polymer electrolyte membrane; a platelike anode-side separator positioned on one side of the MEA so that the front surface thereof contacts the anode, with fuel gas passages through which fuel gas flows being formed in the front surface; and a platelike cathode-side separator positioned on the other side of the MEA so that the front surface thereof contacts the cathode, with oxidizing gas passages through which oxidizing gas flows being formed in the front surface; a cell stack in which a plurality of said cells is stacked; and a cooling water flow passage, through which cooling water flows, formed on at least the rear surface of one from among the anode-side separator and the cathode-side separator of at least a prescribed cell in said cell stack; where said fuel gas, oxidizing gas, and cooling water flow through said fuel gas passage, oxidizing gas passage, and cooling water passage, respectively, in a manner not running counter to gravity.

8 Claims, 11 Drawing Sheets

U.S. PATENT DOCUMENTS

| | | | |
|---|---|---|---|
| 6,232,006 B1 | 5/2001 | Breault | |
| 6,306,530 B1 | 10/2001 | Blondin et al. | |
| 6,322,918 B1 | 11/2001 | Kelley et al. | |
| 6,406,809 B1 * | 6/2002 | Fujii et al. | 429/34 |
| 6,413,664 B1 | 7/2002 | Wilkinson et al. | |
| 6,420,061 B1 | 7/2002 | Fujii | |
| 6,492,055 B1 | 12/2002 | Shimotori et al. | |
| 6,607,858 B2 | 8/2003 | Wozniczka et al. | |
| 6,866,955 B2 * | 3/2005 | Lee et al. | 429/26 |
| 2002/0041984 A1 | 4/2002 | Chow et al. | |
| 2002/0071981 A1 | 6/2002 | Sano | |
| 2002/0146601 A1 | 10/2002 | Sugiura et al. | |
| 2003/0049515 A1 | 3/2003 | Wariishi | |
| 2003/0077501 A1 * | 4/2003 | Knights et al. | 429/38 |
| 2003/0219635 A1 | 11/2003 | Lee et al. | |
| 2004/0091761 A1 | 5/2004 | Enjoji et al. | |

OTHER PUBLICATIONS

Office Action for corresponding Canadian Patent Application dated Feb. 12, 2008.

* cited by examiner

POLYMER ELECTROLYTE FUEL CELL

This is a divisional application of Ser. No. 10/873,652 filed Jun. 23, 2004.

BACKGROUND OF THE INVENTION

1. Field of the Invention

The present invention relates to portable power sources, power sources for electric automobiles, fuel cells for use in household cogeneration systems and the like, and in particular, to a polymer electrolyte fuel cell employing a polymer electrolyte.

2. Description of Related Technology

In fuel cells employing polymer electrolytes, a fuel gas containing hydrogen is electrochemically reacted with an oxidizing gas containing oxygen, such as air, to simultaneously generate power and heat. This fuel cell is basically comprised of a polymer electrolyte membrane selectively transferring hydrogen ions and a pair of electrodes formed on either side of the polymer electrolyte membrane, that is, an anode and a cathode. The electrodes are comprised of a catalyst layer, formed on the surface of the polymer electrolyte membrane, that is comprised chiefly of carbon powder supported on a platinum group metal catalyst, and a gas diffusion layer, having both gas permeability and electron-conducting capability, formed on the outer surface of the catalyst layer.

To prevent oxidizing gas and fuel gas fed to the electrodes from leaking to the exterior and to prevent mixing of the two gases, the electrodes are formed on the two surfaces of portions outside the rim portion of the polymer electrolyte membrane and gas seals and gaskets are positioned in a manner surrounding the electrodes on the rim portions of the polymer electrolyte membrane. These gas seals and gaskets are integrated and preassembled with the electrodes and polymer electrolyte membrane. This integrated and preassembly combination is hereinafter referred to as a membrane electrode assembly ("MEA"). The MEA is mechanically secured and electrically conductive separators for electrically connecting adjacent MEAs in series are provided on both sides thereof. Gas passages for feeding reaction gas to the electrode surface and carrying off water that is generated and excess gas are formed on the portions where the separators contact the MEA. The gas passages can be provided separately from the separators, but the method of forming grooves serving as gas passages on the outer surface of the separator is generally adopted.

The supplying of reaction gas to the gas passages and the discharging of water produced and reaction gas from the gas passages are conducted by providing a through-hole known as a manifold hole in the separator, connecting the gas passage inlet and outlet to the manifold hole, and distributing reaction gas to the various gas passages through the manifold hole. Since the fuel cell generates heat during operation, maintaining the cell at proper temperature requires cooling with a cooling fluid, such as cooling water, or the like. Normally, a cooling member through which cooling water flows is provided for every one to three cells. The MEA, separator, and cooling member are stacked in alternating fashion to achieve 10 to 200 cell layers, after which they are sandwiched between terminal plates through current collecting plates and insulating plates, and then secured at each end with fastening rods into a common stacked cell structure. While not wishing to be bound to a specific construction of a cell stack, a typical construction can be found in U.S. Published Application US 2002/01456601 and U.S. Pat. No. 6,413,664, both herein incorporated by reference.

Perfluorosulfonic acid-based materials have come to be used in the polymer electrolyte membranes of such cells. It is normally necessary to moisten the fuel gas and oxidizing gas and feed them to the cell for the polymer electrolyte membrane to develop ion conductivity in a moisture-comprising state. On the cathode side, water is generated in some reactions. Thus, when a gas that has been moistened to increase the dew point to above the working temperature of the cell is supplied, there is sometimes a problem in that condensation forms in the gas passages in the cell and within the electrodes and water blockage occurs, rendering cell performance unstable and decreasing performance. This phenomenon of decreased cell performance and unstable operation due to excessive wetting is generally called "flooding". Additionally, when the fuel cell is being used in a power generating system, it is necessary to systemize the wetting of feed gas and the like. To simplify the system and enhance system efficiency, it is desirable to at least slightly reduce the dew point of the wetted gas that is supplied.

From the perspectives of preventing flooding, enhancing system efficiency, and simplifying the system set forth above, the feed gas is usually moistened so that its dew point is slightly lower than the cell temperature before being supplied.

However, it is also necessary to increase the ion conductivity of the polymer electrolyte membrane to increase the performance of the cell. Thus, it is desirable to moisten the fuel gas and feed it at a relative humidity of near 100 percent, or even at 100 percent humidity and above. Further, from the perspective of the durability of the polymer electrolyte membrane, as well, the supplying of feed gas with a high moisture content is known to be desirable. However, when supplying moist gas at, or close to 100 percent relative humidity, the above-described flooding becomes a problem. That is, in operation of prior cells, the humidity of the feed gas cannot be adjusted accurately and precisely enough to inevitably prevent flooding.

A method of increasing the flow rate of feed gas through the separator passage portion to blow out water that has condensed is known to be an effective way to remove condensation to avoid flooding. However, it then becomes necessary to feed the gas at high pressure to increase the feed gas flow rate in order to blow out the condensed water, requiring an extreme increase in the auxiliary power of the blower or compressor supplying the gas when using the cells in a systemized environment thereby tending to result in deterioration of system efficiency. Further, when flooding occurs on the anode side, flow of fuel gas tends to be blocked or diminished, which ends up being fatal to the fuel cell. This is because load current is forcefully removed in a state where the flow of fuel gas is inadequate, and the carbon supporting the catalyst of the anode ends up reacting with water in the atmosphere to produce electrons and protons in a state without fuel. As a result, dissolution of carbon in the catalyst layer permanently damages the catalyst layer of the anode.

Furthermore, in systems in which stacked cells are mounted, commercial considerations dictate that the cell be able to operate not only under rated output conditions, but also operate under low loads when output is reduced based on power demand. Maintaining efficiency under low load operation requires that the use rates of fuel gas and oxidizing gas be made identical to rated operation conditions. That is, when the load is reduced by ½ relative to rated operation, for example, if the flow rates of the fuel gas and oxidizing gas are not decreased by about ½, excess fuel gas and oxidizing gas are consumed, causing power generation efficiency to drop. However, when the gas use rate is preset and low load operation is conducted, there are problems in that the gas flow rate in the gas passages decreases, condensation water and generated water cannot be discharged from the separator, the above-described flooding occurs, cell performance decreases, and performance becomes unstable.

It is also known that condensed water and generated water collect in portions of the gas passage where the flow runs against gravity if such portions are present, tending to cause flooding. As a countermeasure, methods of making the oxidizing gas or fuel gas flow in directions that do not run against gravity have been proposed (Japanese Patent Application Publication Nos. Hei 11-233126 and 2001-068131, both incorporated herein by reference). Based on these methods, the oxidizing gas or fuel gas is made to flow in directions that do not run counter to gravity, thereby permitting smooth discharge of condensed water and generated water and inhibiting flooding. However, this proposal does not address the drying out of the polymer electrolyte membrane necessary to develop ion conductivity.

SUMMARY OF THE INVENTION

Generally, as the oxidizing gas and fuel gas flow from the cell inlet to the outlet, the quantity of gas decreases and the amount of water generated increases the farther downstream the gas moves, so the relative humidity increases. Further, when 100 percent relative humidity is exceeded, the amount of moisture becoming condensation increases. By contrast, the cooling water increases in temperature from a minimum temperature at the inlet to the cell to a maximum temperature as it moves toward the outlet. As stated above, feed gas must be fed into the cell in a moist state at, or close to 100 percent relative humidity. Normally, the cooling water flows to the main surface over which the reaction gas of the separator flows and the main surface on the reverse side, thereby cooling the heat-generating electrodes through the separator. Here, if the cooling water is made to flow in the opposite direction to the flow of the reaction gas, it becomes necessary to supply reaction gas that has been moistened to 100 percent relative humidity relative to the high-temperature cooling water. Further, this large quantity of moistened gas that is supplied all becomes condensation water at the reaction gas downstream portion where the temperature of the cooling water is low, so flooding due to water blockage, and the like, tends to occur. Further, in actual cogeneration systems, when cooling water is employed to moisten the feed gas, it is impossible to raise the moistening temperature to the same temperature as the outlet temperature of the cooling water. As a result, since the reaction gas cannot be supplied at a relative humidity of 100 percent, there is a problem in that the polymer electrolyte membrane tends to become dry in spots near the gas inlet and durability deteriorates.

Further, if the cooling water is fed to the stack from the top in the direction of gravity, flowing downward, the cooling water branches under gravity into each cooling water flow passage from the inlet manifold hole of the cooling water, causing larger quantities of cooling water to flow to cells closer to the cooling water inlet pipe of the manifold hole and resulting in uneven distribution of cooling water. In particular, since the amount of heat generated by the power generation reaction diminishes during partial load operation, it is necessary to reduce the flow rate of cooling water to maintain a constant cell temperature. This reduction also creates the problem of uneven cooling water distribution.

The present invention has for its object to solve the above-stated problems. To achieve this object, the polymer electrolyte fuel cell of the present invention is equipped with a cell comprising an MEA having a hydrogen ion-conducting polymer electrolyte membrane and an anode and a cathode sandwiching the polymer electrolyte membrane, a platelike anode-side separator the front surface of which is positioned on one side of the MEA so as to be in contact with the anode, with fuel gas passages through which fuel gas flows being formed in this front surface, and a platelike cathode-side separator the front surface of which is positioned on the other side of the MEA so as to be in contact with the cathode, with oxidizing gas passages through which oxidizing gas flows being formed in this front surface; a cell stack in which multiple cells of this type are stacked; and cooling water flow passages, through which cooling water flows, formed on at least the back surface of either the anode side separator or the cathode side separator of at least a prescribed cell of the cell stack. The fuel gas, oxidizing gas, and cooling water are made to flow through the fuel gas passages, oxidizing gas passages, and cooling water passages, respectively, without running counter to gravity. However, there may be portions in the manifold where the fuel gas, oxidizing gas, or cooling water flows counter to gravity.

In one embodiment, at least one of the fuel gas flow passages, oxidizing gas flow passages, and cooling water flow passages may also be formed to run downstream either horizontally or with a downward gradient.

In another embodiment, at least one from among the fuel gas flow passages, oxidizing gas flow passages, and cooling water flow passages may be essentially configured of horizontal and vertical portions. In an alternative embodiment, the fuel gas flow passages, oxidizing gas flow pass and cooling water flow passages comprise downwardly sloping and vertical portions.

The upstream portion of the oxidizing gas flow passage may be positioned in the vicinity of the inlet of the cooling water flow passage in the cathode-side separator.

The upstream portion of the fuel gas flow passage may be positioned in the vicinity of the inlet of the cooling water flow passage in the anode-side separator.

The cooling water flow passages and oxidizing gas flow passages may be formed so as to be aligned approximately throughout as viewed in the direction of thickness in the cathode-side separator.

In the anode-side separator or cathode-side separator, an inlet manifold hole feeding cooling water to the cooling water passages may be provided so as to run through the separator in the direction of its thickness and to have a constriction comprised of locally narrowing portions in the opposing internal circumference surfaces, with a first portion that is positioned on one side of the constriction and communicates to a cooling water supply pipe and a second portion that is positioned on the other side of the constriction and communicates to the cooling water flow passage.

In the anode-side separator or cathode-side separator, an inlet manifold hole feeding cooling water to the cooling water passages may be provided so as to run through the separator in the direction of its thickness and to have a step running in a circumferential direction on the lower portion of the inner circumference surface, with a first portion that is positioned beneath the step and communicates to a cooling water supply pipe and a second portion that is positioned above the step and communicates to the cooling water flow passage.

The above object and additional objects, characteristics, and advantages will be made clear from a detailed description of suitable implementation modes below with reference to the attached drawings.

DETAILED DESCRIPTION OF THE INVENTION

1. Concept of the Invention

Figure 1:
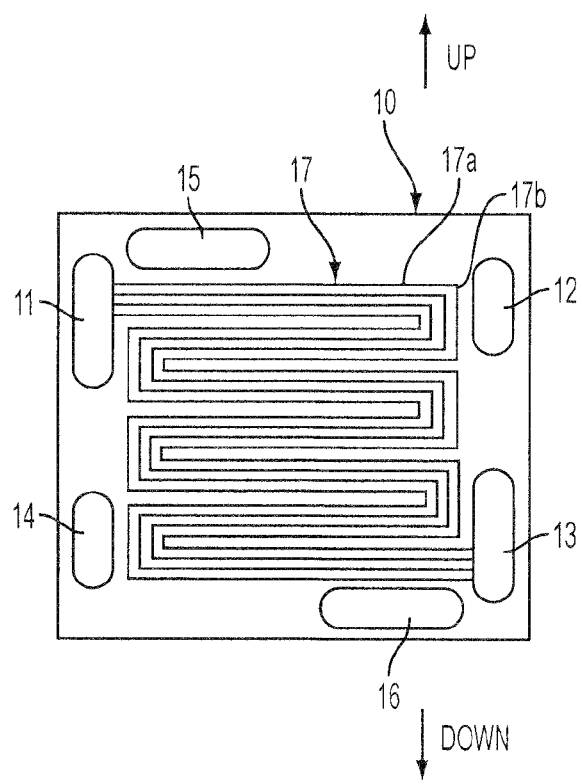
FIG. 1 is a front view of the cathode-side separator employed in the fuel cell of a first mode of implementing the present invention.

The concept of the present invention will be described first. The present inventors discovered that by directing the flow passages of at least one of the fuel gas, the oxidizing gas and the coolant fluid, preferably at least two flows, most preferably all flows in a direction that does not run counter to gravity the flows of oxidizing gas, fuel gas, and cooling water that occur in a surface parallel to the surface on which the electrodes extend, it was possible to promote the smooth discharge of condensation water, improve toughness with respect to flooding, prevent drying of the electrolyte membrane in the gas inlet portion, and improve the durability of the fuel cells. A first aspect of the present invention was based on this knowledge.

Further, a second aspect of the present invention ensures the good distribution of cooling water by providing a constriction or step in the cooling water inlet manifold hole.

2. Detailed Description of the Embodiments of the Invention

To enhance the commercial properties of fuel cell power generating systems, the load of the fuel cell can desirably be varied based on power demand without a drop in power generation efficiency. To that end, when increasing the load relative to the rated output, operation must be conducted with the flow outputs of fuel gas and oxidizing gas correspondingly increased, and when decreasing the load relative to the rated output, operation must be conducted with the flow rates of the fuel gas and oxidizing gas correspondingly reduced. Normally, the gas passages provided in the electrically conductive separator employed in the fuel cell are designed to yield the gas flow speeds best suited to the rated output. Accordingly, when increasing the power load, the gas flow speed in the passages increases as the gas flow rate increases, and when decreasing the power load, the gas flow speed in the passages decreases as the gas flow rate decreases. Since the pressure loss of the feed gas increases when increasing the gas flow speed in the passages, power generation efficiency drops somewhat due to increased auxiliary motor power. However, since the gas flow speed in the passages increases, it becomes possible to efficiently remove condensation water and generated water in the gas passages of the separator and flooding does not occur.

However, when decreasing the power load, the gas flow speed in the passages decreases as the gas flow rate decreases. When the gas flow speed in the passages decreases, it becomes difficult to efficiently remove condensation water and generated water from the gas passages of the separator based on gas flow speed and flooding occurs. At such times, although the power load has been reduced, the flow rate of the feed gas must also be reduced, the relative proportion of auxiliary power relative to power output increases, and the power generating efficiency of the generating system as a whole decreases. Further, it is necessary at such times to change the cooling water flow rate to match the change in power load to keep the temperature of the fuel cells constant. In particular, when decreasing the flow rate of cooling water during a low load, the uniform distribution of cooling water is lost.

The present invention causes at least one of, preferably at least two of, and most preferably all of the oxidizing gas passages and fuel gas passages, to run in directions that are not counter to gravity, thereby promoting the smooth discharge of condensation water to prevent flooding, while simultaneously supplying cooling fluid passages proximate the inlets of the fuel gas and/or oxidizing gas passages eliminating drying out of the electrolyte membrane in the gas inlet portion to enhance durability. For example, when the flow speed of gas becomes ¼ when the ratio of the maximum load generation output to the minimum load generation output is set at 4 to 1, the gas use rate is made constant, and the gas flow is decreased. In a conventional separator, when the gas flow speed decreases, condensation water cannot be discharged against gravity and flooding occurs. By contrast, in one embodiment of the present invention, since the oxidizing gas and the fuel gas are both constantly made to flow in a direction not running counter to gravity, it was discovered that the smooth discharge of condensation water became possible and flooding did not occur. Further, it was discovered that drying out of the electrolyte membrane could be eliminated and durability thus improved by matching the gas inlet port with the lowest relative humidity with the inlet port of the cooling water as viewed in the direction of thickness of the separator.

Further, in another embodiment according to the invention, it was found that by providing a constriction in the cooling water inlet manifold hole, it was possible to improve the uniformity of cooling water distribution in the course of distributing cooling water supplied to the cell stack to multiple cooling water passages in the cell stack. It was further discovered that by positioning the inlet of each of the passages for distribution of cooling water from the cooling water inlet manifold hole to the various passages higher in the direction of gravity than the position at which the cooling water was supplied to the cooling water manifold hole, it was possible to ensure uniform distribution even when the cooling water flow rate had been reduced, thereby achieving stable operation.

The various modes of implementing the present invention are described below with reference to the figures.

Implementation Mode 1

Figure 12:
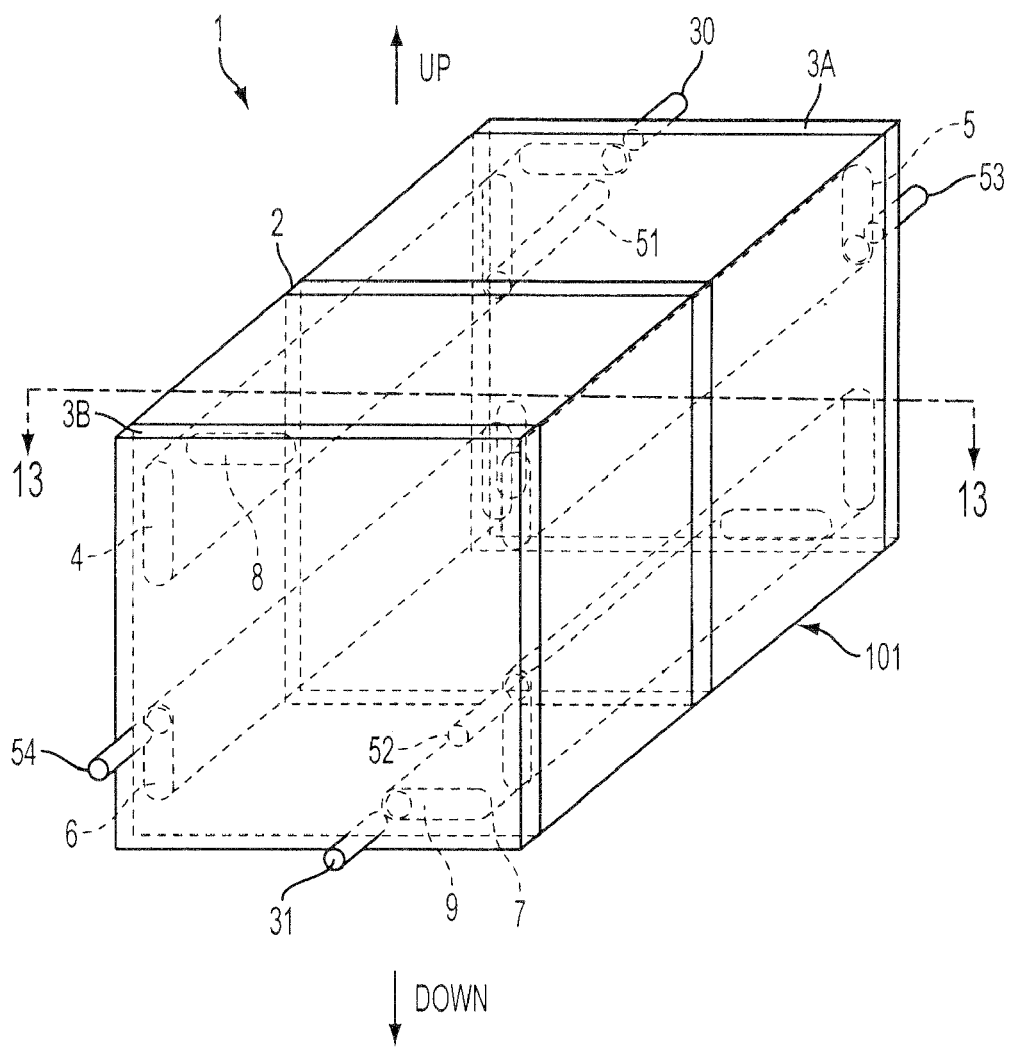
FIG. 12 is a perspective view of the approximate configuration of the polymer electrolyte fuel cell of the first mode of implementing the present invention.
Figure 13:
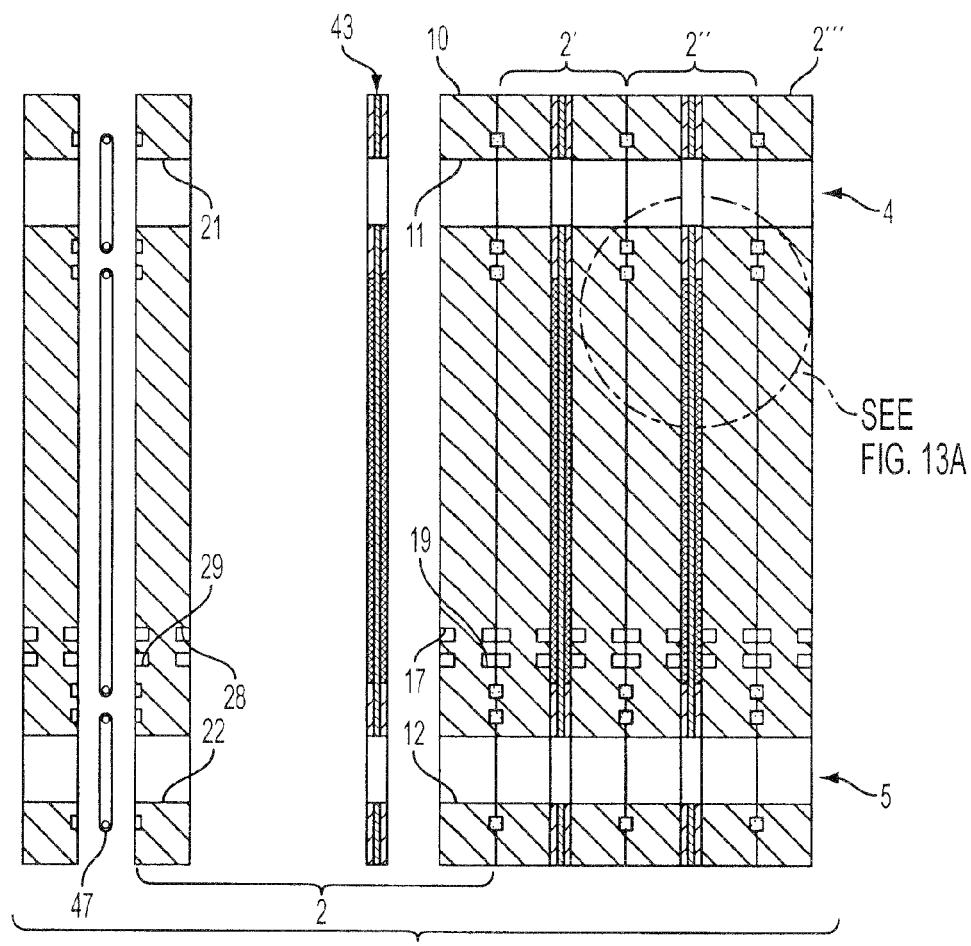
FIG. 13 is a sectional view along section lines XIII-XIII of FIG. 12.
Figure 13A:
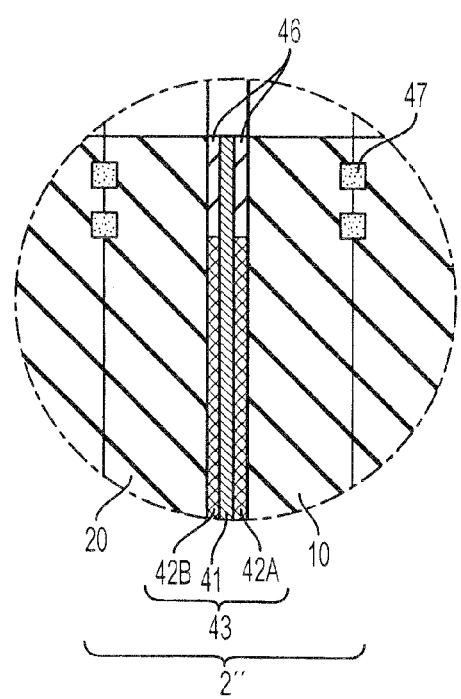
FIG. 13A is a sectional, enlarged view along lines A-A of FIG. 13.

FIG. 12 is a perspective view of the schematic configuration of a polymer electrolyte fuel cell (referred to simply as a "fuel cell" hereinafter) relating to Implementation Mode 1 of the present invention. FIG. 13 is a sectional view along section line XIII-XIII of FIG. 12. FIG. 13A is a section enlarged view along A-A of FIG. 13.

In FIG. 12, the vertical direction in the fuel cell is denoted as the vertical direction in the figure. The same holds true for FIGS. 1 through 6, described further below.

As shown in FIG. 12, the fuel cell of the present implementation mode has a cell stack 1.

Cell stack 1 comprises a cell stack body 101 in which cells 2, 2', 2", 2"', etc., with an overall platelike shape are stacked in the direction of their thickness, first and second end plates (3A, 3B) positioned on the two ends of cell stack body 101, and fasteners (not shown), fastening cell stack body 2 and first and second end plates 3A and 3B in the stacking direction of cell 2. Further, current collecting terminals (not shown) are positioned on first end plate 3A and second end plate 3B.

Platelike cells 2 extend parallel to the vertical. Accordingly, the stacking direction of cells 2, 2', 2", 2"', etc. is horizontal.

Oxidizing gas supply manifold 4 is formed in the top part of one of the sides (referred to as the "side 1 portion" hereinafter) of cell stack body 101 so as to run through cell stack body 101 in the stacking direction. One end of oxidizing gas supply manifold 4 communicates with the through-hole formed in first end plate 3A, with oxidizing gas supply pipe 51 being connected to this through-hole. The other end of oxidizing gas supply manifold 4 is sealed off by end plate 3B. Further, an oxidizing gas discharge manifold 7 is formed in the lower part of the other side portion (referred to as the "side 2 portion" hereinafter) of cell stack body 101 so as to run through cell stack body 101 in the stacking direction. One end (i.e., the discharge end) of oxidizing gas supply manifold 7 is sealed off by first end plate 3A. The other end of oxidizing gas discharge manifold 7 communicates with the through-hole formed in second end plate 3B, with oxidizing gas discharge pipe 52 being connected to this through-hole.

A fuel gas supply manifold 5 is formed in the upper part of the side 2 portion of cell stack body 101 so as to run through cell stack body 101 in the stacking direction. One end of fuel gas supply manifold 5 communicates with a through-hole formed in first end plate 3A, with fuel gas supply pipe 53 being connected to this through-hole. The other end of fuel gas supply manifold 5 is sealed off by second end plate 3B. Further, a fuel gas discharge manifold 6 is formed in the lower part of the side 1 portion of cell stack body 101 so as to run through cell stack body 101 in the stacking direction. One end of fuel gas discharge manifold 6 is sealed off by first end plate 3A. The other end of fuel gas supply manifold 5 communicates with a through-hole formed in second end plate 3B, with fuel gas discharge pipe 54 being connected to this through-hole.

A cooling water supply manifold 8 is connected to the inside of the top part of oxidizing gas supply manifold 4 so as to run through cell stack body 101 in the stacking direction. One end of cooling water supply manifold 8 communicates with a through-hole formed in first end cap 3A, with a cooling water supply pipe 30 being connected to this through-hole. The other end of cooling water supply manifold 8 is sealed by second end plate 3B. Further, a cooling water discharge manifold 9 is formed on the inside of the lower part of oxidizing gas discharge manifold 7 so as to run through cell stack body 101 in the stacking direction. One end of cooling water discharge manifold 9 is sealed off by first end plate 3A. The other end of cooling water discharge manifold 9 communicates with a through-hole formed in second end plate 3B, with a cooling water discharge pipe 31 being connected to this through-hole. Cooling water supply manifold 8 and cooling water discharge manifold 9 have cross-sections in the form of long holes or slots (a shape in which two opposing straight lines have been replaced with semicircles on two sides) running in the horizontal direction.

As shown in FIG. 13, cell 2 is comprised of a platelike MEA 43, and a cathode-side separator 10 and an anode-side separator 20 positioned in contact with the two main surfaces of MEA 43. Cells 2 are stacked so that in adjacent cells 2 and 2' (FIG. 13), the back side of the cathode-side separator 10 of one cell 2 contacts the back side of the anode-side separator 20 of the other cell 2'. MEA 43, cathode-side separator 10, and anode-side separator 20 are formed in a single shape (here, rectangles) of the same size. An oxidizing agent inlet manifold hole, oxidizing agent outlet manifold hole, fuel inlet manifold hole, fuel outlet manifold hole, cooling water inlet manifold hole, and cooling water outlet manifold hole are formed in MEA 43, cathode-side separator 10, and anode-side separator 20 at prescribed mutually corresponding spots so that they run in the direction of thickness of these parts. The oxidizing agent inlet manifold holes, oxidizing agent outlet manifold holes, fuel inlet manifold holes, fuel outlet manifold holes, cooling water inlet manifold holes, and cooling water outlet manifold holes of all of the MEAs 43, cathode-side separators 10, and anode-side separators 20 are linked in all of cells 2, forming oxidizing agent supply manifold 4, oxidizing agent discharge manifold 7, fuel supply manifold 5, fuel discharge manifold 6, cooling water supply manifold 8, and cooling water discharge manifold 7, respectively.

Oxidizing agent gas passage 17 and cooling water passage 19 are formed in the front surface and back surface, respectively, of cathode-side separator 10. As described further below, oxidizing agent gas passage 17 is formed so as to connect the oxidizing agent gas inlet manifold hole and the oxidizing agent gas outlet manifold. As described further below, cooling water passage 19 is formed so as to connect the cooling water inlet manifold hole and the cooling water outlet manifold hole. Cathode-side separator 10 is positioned with its front surface in contact with MEA 43.

Fuel gas passage 28 and cooling water passage 29 are formed in the front surface and back surface, respectively, of anode-side separator 20. As described further below, fuel gas passage 19 is formed so as to connect the fuel gas inlet manifold hole and the fuel gas outlet manifold hole. As described further below, cooling water passage 29 is formed so as to connect the cooling water inlet manifold hole and the cooling water outlet manifold hole. Anode-side separator 20 is positioned with its front surface in contact with MEA 43.

Passages 17, 19, and 28 are comprised of grooves formed in the main surfaces of cathode-side separator 10 and anode-side separator 20. In FIG. 13, passages 17, 19, 28, and 29 are each comprised of two passages, but can also be comprised of multiple passages.

The cooling water passage 19 of cathode-side separator 10 and the cooling water passage 29 of adjacent anode-side separator 20 are formed so as to match up (i.e., connect) when cells 2, 2' (FIG. 13) are stacked, the two forming a single cooling water passage.

O-ring receiving grooves are formed on the back side of cathode-side separator 10 and on the back side of anode-side separator 20 so as to surround the cooling water inlet manifold hole, cooling water outlet manifold hole, cooling water passage, oxidizing agent inlet manifold hole, oxidizing agent outlet manifold hole, fuel inlet manifold hole, and fuel outlet manifold hole, respectively, and O-rings 47 are positioned in those grooves. Thus, the manifold holes are sealed off from each other.

MEA 43 comprises a polymer electrolyte membrane 41, a cathode 42A, an anode 42B, and a pair of gaskets 46. Cathode 42A and anode 42B are formed on the two surfaces of portions outside the rim portion of polymer electrolyte membrane 41, with gaskets 46 being positioned on the two surfaces of the rim portions of polymer electrolyte membrane 41 so as to surround cathode 42A and anode 42B. The pair of gaskets 46, cathode 42A, anode 42B, and polymer electrolyte membrane 41 are integrated.

Cathode 42A, anode 42B, the area in which oxidizing agent gas passage 17 is formed and the area in which cooling water passage 19 is formed in cathode-side separator 10, and the area in which fuel gas passage 28 is formed and the area in which cooling water passage 29 is formed in anode-side separator 20 are positioned so as to essentially line up overall when viewed from the stacking direction of cell 2, 2', 2", etc.

The cathode-side separator and the anode-side separator will be described in detail next.

Figure 2:
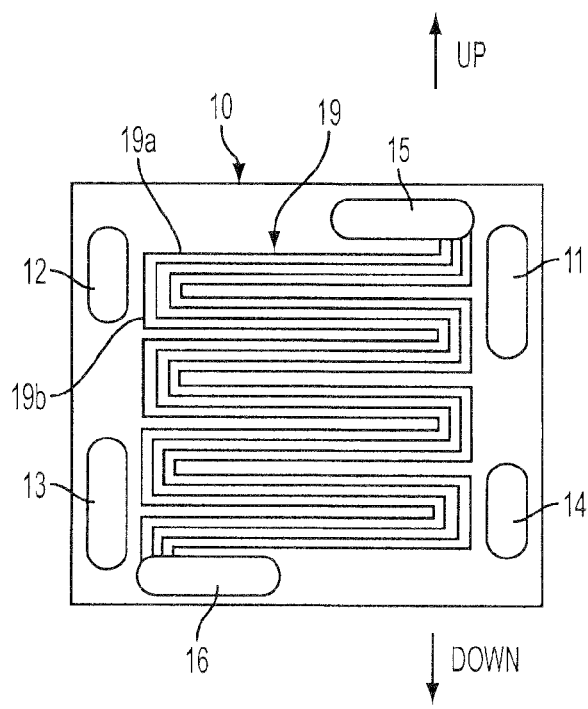
FIG. 2 is a rear view of the same cathode-side separator.
Figure 3:
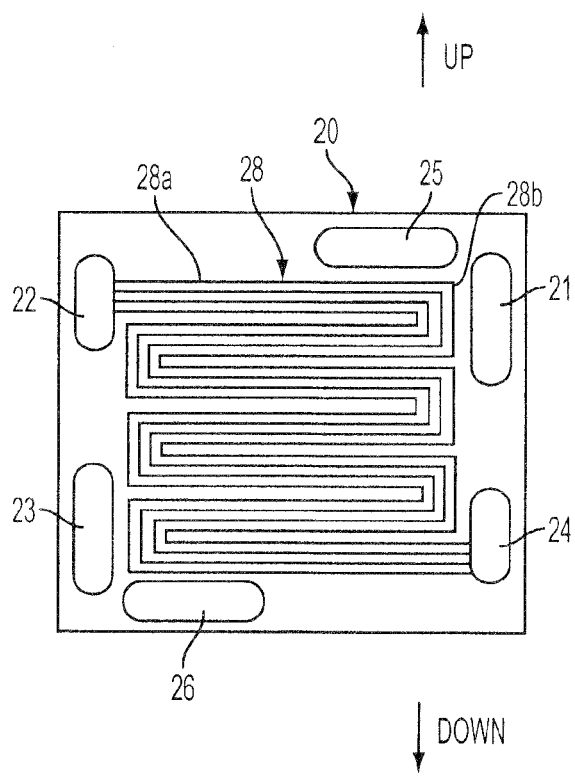
FIG. 3 is a front view of the anode-side separator employed in the fuel cell of the first mode of implementing the present invention.
Figure 4:
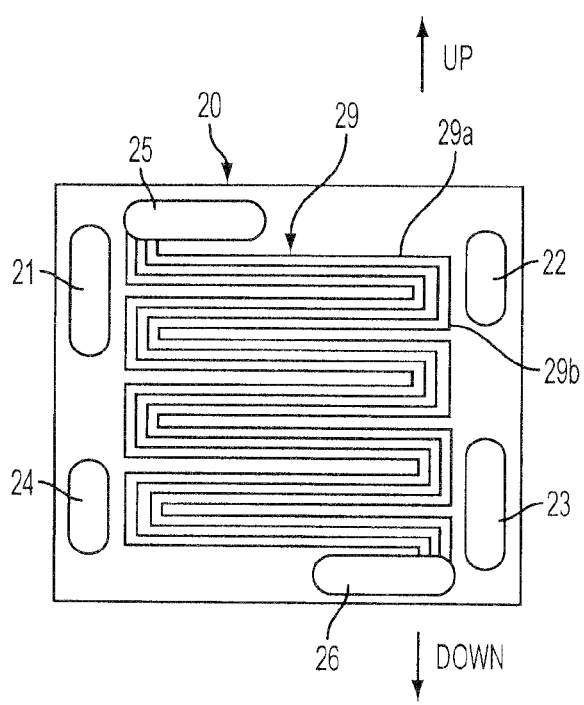
FIG. 4 is a rear view of the same anode-side separator.

FIG. 1 is a front view of the cathode-side separator. FIG. 2 is a rear view of the same. FIG. 3 is a front view of the anode-side separator. And FIG. 4 is a rear view of the same.

As shown in FIG. 1, cathode-side separator 10 comprises an oxidizing gas inlet manifold hole 11 and outlet manifold hole 13, a fuel gas inlet manifold hole 12 and outlet manifold hole 14, and a cooling water inlet manifold hole 15 and outlet manifold hole 16. Separator 10 further comprises a gas passage 17 connecting manifold holes 11 and 13 on the surface facing the cathode, and a passage 19 connecting cooling water manifold holes 15 and 16 on the rear side.

In FIG. 1, oxidizing gas inlet manifold hole 11 is provided in the top part of one side (the left side in the figure: the "first side portion" hereinafter) of separator 10, and outlet manifold hole 13 is provided in the bottom part of the other side (the right side in the figure: the "second side portion" hereinafter) of separator 10. Fuel gas inlet manifold hole 12 is provided in the top part of the second side portion of separator 10 and outlet manifold hole 14 is provided in the bottom part of the first side portion of separator 10. Cooling water inlet manifold hole 15 is provided on the inside of the top part of oxidizing gas inlet manifold hole 11 and outlet manifold hole 16 is provided on the inside of the bottom part of oxidizing gas outlet manifold hole 13. Cooling water manifold holes 15 and 16 are formed as long slots in the horizontal direction.

Oxidizing gas passage 17 is comprised of two passages in the present implementation mode. Naturally, it could be comprised of any number of passages. In this embodiment, each passage is essentially comprised of horizontal portions 17a extending in the horizontal direction and vertical portions 17b extending in the vertical direction. Specifically, each of the passages of oxidizing gas passage 17 runs horizontally from the top part of oxidizing gas inlet manifold hole 11 to the second side portion of separator 10, downward for some distance, horizontally from there to the first side portion of separator 10, and from there downward. From there, the above extension pattern repeats twice, and from that point, runs horizontally, reaching the lower part of oxidizing gas outlet manifold hole 13. The horizontally running portions of each passage form horizontal parts 17a, and the downward running portions form vertical parts 17b. In this manner, in oxidizing gas passage 17, the oxidizing gas weaves back and forth, alternately passing through horizontal parts 17a and vertical parts 17b while flowing in a manner that does not run counter to gravity. As a result, flooding is prevented.

The individual passages are comprised here of horizontal parts 17a and vertical parts 17b. However, they can also be configured to be horizontal and/or downward sloping, optionally including vertical portions, in the direction of the gas flow. However, having the individual passages comprise horizontal parts 17a and vertical parts 17b permits the formation of a highly dense oxidizing gas passage 17.

Figure 14:
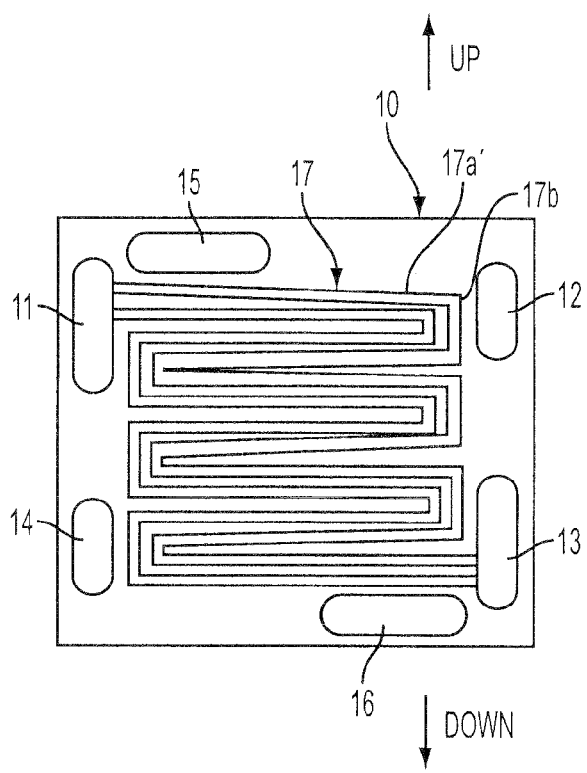
FIG. 14 is a front side view of the cathode-side separative in an alternative embodiment to FIG. 1.

In an alternative embodiment as illustrated in FIG. 14, the passages comprise downwardly sloping portions and vertical portions, none of which run counter to gravity. (In this embodiment, FIG. 14 is similarly numbered to analogous structure in FIG. 1, but the use of prime (') numbers are employed to show the downwardly sloping portions.) In this embodiment, we have shown only one of the two passages comprising downwardly sloping positions for purposes of illustration in FIG. 14. However, it is to be understood that this illustration is exemplary only and not limiting as one, two or all of the passageways may be downwardly sloping and be within the teachings of the invention.

In FIG. 2, cooling water passage 19 is comprised of two passages. Each passage is essentially comprised of horizontally running horizontal parts 19a and vertically running vertical parts 19b. Specifically, each of the passages of cooling water passage 19 runs downward a certain distance from the end portion near oxidizing gas inlet manifold hole 11 of cooling water inlet manifold hole 15. From there, it runs horizontally to the second side portion of separator 10 (the left side in the figure). From there, it runs downward a certain distance, and then extends horizontally to the first side portion (the right side in the picture). From there, the above extension pattern repeats twice, and from the arrival point, runs downward to reach the end portion close to oxidizing gas outlet manifold hole 13 of cooling water outlet manifold hole 16. The horizontally running portions of each passage form horizontal parts 19a and the vertically running portions form vertical portions 19b. Thus, in cooling water passage 19, the cooling water winds back and forth, passing alternately through horizontal parts 19a and vertical parts 19b while flowing in a manner that does not run against gravity.

The following points are important here. Cooling water inlet manifold hole 15 and oxidizing gas inlet manifold hole 11 are positioned in close proximity. Cooling water outlet manifold hole 16 and oxidizing gas outlet manifold hole 13 are positioned in close proximity. Viewed from the direction of thickness of separator 10, cooling water passage 18 is formed in such a manner as to essentially align with oxidizing gas passage 17. As a result, the cooling water and the oxidizing gas flow in essentially the same direction on either side of separator 10. In such a configuration, the oxidizing gas inlet portion where the relative humidity is the lowest roughly corresponds to the cooling water inlet portion when viewed from the direction of thickness of separator 10. Thus, drying out of the polymer electrolyte membrane can be eliminated and the durability of the polymer electrolyte membrane can be improved.

Here, each passage is essentially comprised of horizontal parts 19a and vertical parts 19b. Each passage can also be formed to be horizontal or have a downward gradient in the direction of flow of the cooling water. However, having the individual passages comprise horizontal parts 19a and vertical parts 19b permits the formation of a highly dense cooling water passage 19.

Anode-side separator 20 comprises oxidizing gas inlet manifold hole 21 and outlet manifold hole 23, fuel gas inlet manifold hole 22 and outlet manifold hole 24, and cooling water inlet manifold hole 25 and outlet manifold hole 26. Separator 20 further comprises gas passage 28 connecting manifold holes 22 and 24 on the surface facing the anode, and passage 29 connecting cooling water manifold holes 25 and 26 on the back surface.

In FIG. 3, oxidizing gas inlet manifold hole 21 is provided in the upper part of one side (the right side in the figure: referred to as the "first side portion" hereinafter) of separator 20, and outlet manifold hole 23 is provided in the lower part of the other side (the left side in the figure: referred to as the "second side portion" hereinafter) of separator 20. Fuel gas inlet manifold hole 22 is provided in the upper part of the second side portion of separator 20, and outlet manifold hole 24 is provided in the lower part of the first side portion of separator 20. Cooling water inlet manifold hole 25 is provided on the inside of the upper part of oxidizing gas inlet manifold hole 21, and outlet manifold hole 26 is provided on the inside of the lower part of oxidizing gas outlet manifold hole 23. Cooling water manifold holes 25 and 26 are formed as long horizontally running slots.

Fuel gas passage 28 is comprised of two passages in the present implementation mode. Each passage is essentially comprised of horizontal portions 28a running horizontally and vertical portions 28b running vertically. Specifically, both of the passages of fuel gas passage 28 run from the top portion of fuel gas inlet manifold hole 22 horizontally to the first side portion of separator 20, extending downward from there for a certain distance, after which they run horizontally to the second side portion of separator 20, and then downward for a certain distance. From there, the above extension pattern is repeated twice. From the arrival point, they run horizontally, reaching the lower portion of fuel gas outlet manifold hole 24. The portions of each of the passages running horizontally constitute horizontal portions 28a and those extending downward constitute vertical portions 28b. Thus, in fuel gas passage 28, the fuel gas winds back and forth, flowing alternately through horizontal portions 28a and vertical portions 28b in a manner that does not run counter to gravity. As a result, flooding is prevented.

Here, the passages are essentially comprised of horizontal portions 28a and vertical portions 28b. However, it suffices for them to be made horizontal or have a downward incline (including vertical) in the direction of gas flow. However, having the individual passages be comprised of horizontal parts 28a and vertical parts 28b permits the formation of a highly dense fuel gas passage 28.

Figure 15:
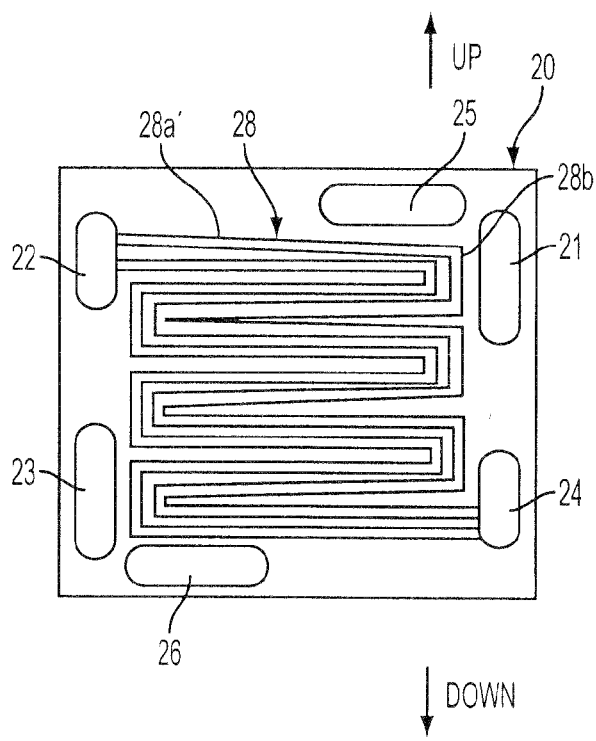
FIG. 15 is a front view of the anode-side separator in an alternative embodiment of FIG. 3.

As shown in an alternative embodiment to FIG. 3 as shown in FIG. 15, the passages are shown in a downward incline with like numbers being given the same numerals as in FIG. 3 with analogous elements marked with a prime ('). As with the description of FIG. 14, only one passage is shown with a downward gradient, but it is to be understood that, as in FIG. 14, such teaching is exemplary only and non-limiting as one, two or all passages may possess a downward gradient.

In FIG. 4, cooling water passage 29 is formed as the mirror image of the cooling water passage 19 formed on the back surface of cathode separator 10 in FIG. 2. That is, each of the passages is essentially comprised of horizontally extending horizontal portions 29a and vertically extending vertical portions 29b. Specifically, the individual passages of cooling water passage 29 extend downward for some distance from the end portion, near oxidizing gas inlet manifold hole 21, of cooling water inlet manifold hole 25. From there, they run horizontally to the second side portion (the right side in the figure) of separator 20, downward for some distance, and then horizontally to the first side portion (the left side in the figure). From there, this extension pattern is repeated twice. From the arrival point, they extend downward to the end, near oxidizing gas outlet manifold hole 23, of cooling water outlet manifold hole 26. The portions of the passages running horizontally constitute horizontal portions 29a and the portions running downward constitute vertical portions 29b. Thus, in cooling water passage 29, the cooling water winds back and forth, flowing alternately through horizontal portions 29a and vertical portions 29b while flowing in a manner that does not run counter to gravity.

Here it is important to note the following points. Both cooling water inlet manifold hole 25 and fuel gas inlet manifold hole 22 are provided in the top portion of separator 20. Both cooling water outlet manifold hole 26 and fuel gas outlet manifold hole 24 are provided in the bottom portion of separator 20. When viewed in the direction of thickness of separator 20, cooling water passage 29 is formed to be essentially aligned with fuel gas passage 28. As a result, the cooling water and the oxidizing gas flow in mutually opposed directions on either side of separator 20 in the horizontal direction, but in the vertical direction, they flow in the same overall direction from top to bottom. Such a configuration positions the upstream portion of fuel gas passage 28, where the relative humidity is the lowest, above the spot where the cooling water inlet portion is positioned, where the temperature is the lowest, in the vertical direction of separator 20. This helps prevent drying out of the polymer electrolyte, and thus improves the durability of the polymer electrolyte membrane.

Here, the individual passages are essentially comprised of horizontal portions 29a and vertical portions 29b. However, it suffices for the passages to run horizontally or have a downward gradient in the direction of flow of the cooling water. Configuring the passages with horizontal portions 29a and vertical portions 29b permits the forming of a highly dense cooling water passage 29.

As previously stated, the cell is comprised of an MEA sandwiched between the above-described cathode-side separator 10 and anode-side separator 20. Accordingly, adjacent cells are laid out so that the cooling water passages 19 and 29 of the cathode-side separator 10 and anode-side separator 20 line up to form cooling members. When a cooling member is provided in each of multiple cells, instead of the above-described multiple separators, a single separator, one surface of which functions as a cathode-side separator and the other surface of which functions as an anode-side separator, can be suitably employed.

The fuel gas, oxidizing gas, and cooling water flow operations of a fuel cell configured as set forth above will be described next.

In FIGS. 1 through 6, 12, and 14, fuel gas passes through a fuel gas supply pipe 43 and is fed into fuel gas supply manifold 5 of cell stack 1. The fuel gas that is supplied flows from fuel gas supply manifold 5 to the inlet manifold hole 22 of each cell 2 over fuel gas passage 28. During this time, it reacts with oxidizing gas through the anode, polymer electrolyte membrane, and cathode and is consumed: Unconsumed fuel gas is caused to flow out from outlet manifold hole 24 to fuel gas discharge manifold 6 as off gas, and is discharged through fuel gas discharge pipe 44 from cell stack 1.

Oxidizing gas passes through oxidizing gas supply pipe 41 and is fed to the oxidizing gas supply manifold 8 of cell stack 1. The oxidizing gas that is supplied flows from oxidizing gas supply manifold 4 into the inlet manifold hole 11 of each cell 2 and passes through oxidizing gas passage 17. During this time, it reacts with fuel gas through the cathode, polymer electrolyte membrane, and anode and is consumed. Unconsumed oxidizing gas is caused to flow out from outlet manifold hole 13 to oxidizing gas discharge manifold 7, and is discharged through oxidizing gas discharge pipe 42 from stack 1.

Cooling water passes through cooling water supply pipe 30 and is fed to cooling water supply manifold 8 of cell stack 1. The cooling water that is supplied flows from cooling water supply manifold 8 into the inlet manifold holes 15 and 25 of each cell 2 and passes along cooling water passages 19 and 29. During this period, cooling water passes through cathode separator 10 and anode separator 20, cooling the cathode and anode and collecting heat therefrom. It flows from outlet manifold holes 16 and 26 to cooling water discharge manifold 9, and is discharged through cooling water discharge pipe 31 from cell stack 1.

In this process, the fuel gas and oxidizing gas flow through fuel gas passage 28 and oxidizing gas passage 17, respectively, in a manner that does not run counter to gravity, thereby preventing flooding.

In each of separators 10 and 20, the upstream portions of fuel gas passage 28 and oxidizing gas passage 17 are positioned in the vicinity of the cooling water inlet, where the relative humidity is the lowest, thereby preventing drying out of the polymer electrolyte membrane.

Implementation Mode 2

Figure 5:
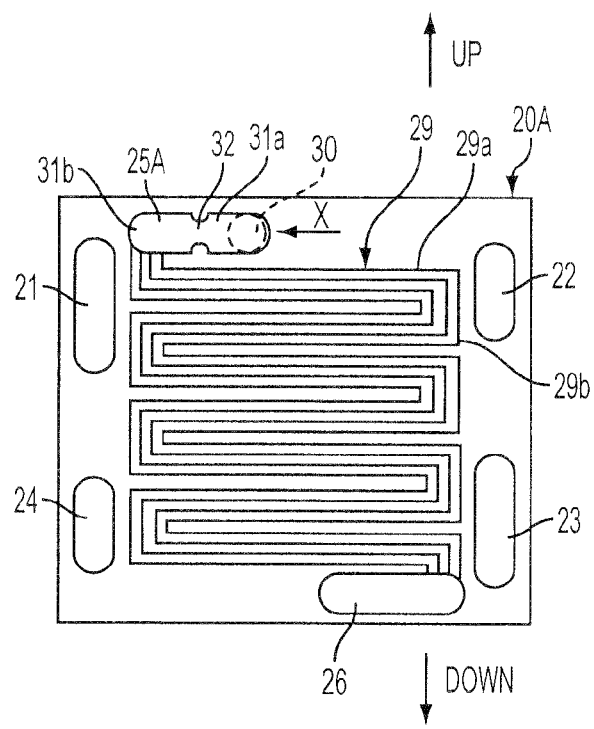
FIG. 5 is a rear view of an anode-side separator employed in the fuel cell of a second mode of implementing the present invention.

FIG. 5 is a view of the rear surface of the anode-side separator of the fuel cell of Implementation Mode 2. FIG. 5 shows parts that are identical or correspond to parts in FIG. 4.

In the present implementation mode, cooling water supply manifold 8 in cell stack 1 of Implementation Mode 1 shown in FIG. 12 has the same cross-sectional shape as the cooling water inlet manifold hole 25A of the anode-side separator 20A shown in FIG. 5.

As shown in FIG. 5, in anode-side separator 20A, cooling water inlet manifold hole 25A is divided by a constriction (shown in FIG. 5 as opposed protrusions although other constructive shapes may be employed) 32 into a first portion 31a and a second portion 31b. Although not shown, the cathode-side separator and MEA cooling water inlet manifold hole are fashioned with the same shape as cooling water inlet manifold hole 25A of anode-side separator 20A. First portion 31a of inlet manifold hole 25A is where cooling water supplied by cooling water supply pipe 30 to cooling water supply manifold 8 passes, and second portion 31b is where cooling water is supplied to cooling water passage 29. The remainder of the present implementation mode is identical to Implementation Mode 1.

Referring to FIGS. 12 and 5, in the fuel cell of the present implementation mode configured as set forth above, cooling water is supplied to the portion corresponding to first portion 31a of inlet manifold hole 25A of cooling water supply manifold 8 by cooling water supply pipe 30. The cooling water that is supplied is distributed to individual cells 2 while flowing in the direction of stacking of cell stack 1. When there is no constriction 32 in inlet manifold hole 25A, the effect of gravity causes larger quantities of cooling water to tend to flow into the cells that are closer to cooling water supply pipe 30. In the present implementation mode, constriction 32 has the effect of causing the cooling water supplied to cooling water inlet manifold hole 25A to first fill the upstream side of constriction 32, that is, the interior of first portion 31a, before passing through second portion 31b to the cooling water passages 29 of each of cells 2. This permits the uniform distribution of cooling water to both the cell 2 that is the closest to cooling water supply pipe 30 to the cell 2 that is the farthest from it. The cross-sectional area in the direction of passage of cooling water of constriction 32 is desirably set to fall within a range of 1 to 10-fold the sum of the sectional areas of each of the passages of cooling water passage 29. The direction of passage of cooling water of constriction 32 is the direction indicated by the X arrow in FIG. 5; that is, the horizontal direction within the plane of extension of cell 2 (and thus separator 20A).

Implementation Mode 3

Figure 6:
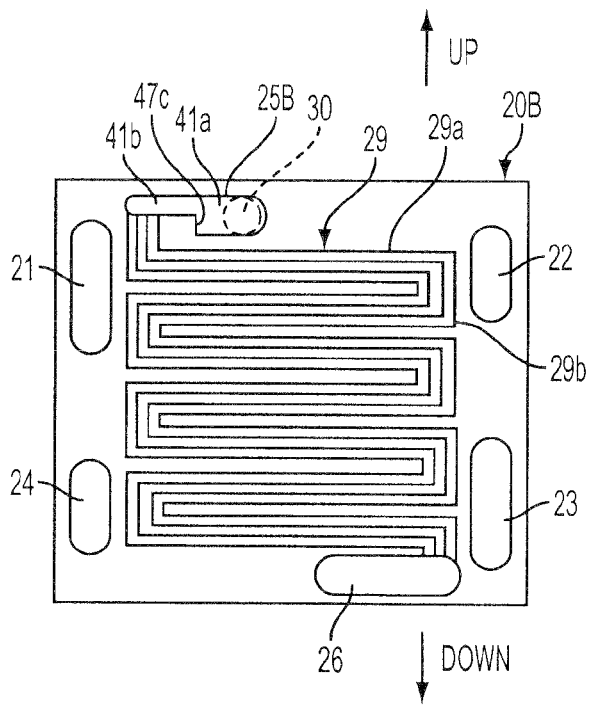
FIG. 6 is a rear view of an anode-side separator employed in the fuel cell of a third mode of implementing the present invention.

FIG. 6 is a rear surface view of the anode-side separator of the fuel cell of Implementation Mode 3 of the present invention. FIG. 6 shows parts that are identical or correspond to parts in FIG. 4.

In the present implementation mode, cooling water supply manifold 8 in cell stack 1 of Implementation Mode 1 shown in FIG. 12 has the same cross-sectional shape as cooling water inlet manifold hole 25B of anode-side separator 20B shown in FIG. 6.

In separator 20B, cooling water inlet manifold hole 25B has a bottom with two sections: a first portion 41a with a deep bottom and a second portion 41b with a shallow bottom. In other words, inlet manifold hole 25B has a step 47c in the circumferential direction of the bottom of the inner circumferential surface, with a first portion 41a positioned beneath step 47c and the second portion 41b positioned above step 47c. Although not shown, the cooling water inlet manifold holes of the MEA and the cathode-side separator may also be fashioned in the same shape as cooling water inlet manifold hole 25B of anode-side separator 20B. First portion 41a of inlet manifold hole 25B is where cooling water supplied to cooling water supply manifold 8 by cooling water supply pipe 30 flows, and second portion 41b is where cooling water is supplied to cooling water passage 29.

In separator 20B, second portion 41b for distributing cooling water from cooling water inlet manifold hole 25B to the individual passages is formed at a position that is vertically higher than first portion 41a supplied with cooling water by cooling water supply pipe 30. Imparting this shape to cooling water inlet manifold hole 25B causes cooling water that has filled first part 41a on the upstream side of second portion 41b to increase the horizontal flow speed in the plane of extension of separator 20B in second part 41b and causes cooling water to be distributed to the individual passages while maintaining this flow speed, further enhancing the uniform distribution of cooling water. When, as in Implementation Mode 2, the configuration consists of only a constriction 32 on the inlet side of second portion 31b and the cooling water flow rate is reduced during partial load operation, the effect of the constriction diminishes and the uniform distribution of cooling water may be compromised. However, in the present implementation mode, since the bottom of second portion 41b located on the downstream side is shallower than the bottom of first portion 41a located on the upstream side, even when the cooling water flow rate is low, the cooling water supplied by cooling water supply pipe 30 temporarily collects in first portion 41a and then flows to second part 41b communicating to the individual passages of cooling water passage 29, ensuring uniform distribution. Further, foreign matter contained in the cooling water settles in first portion 41a, preventing it from flowing into cooling water passages 29 and preventing cooling water blockage by foreign matter and the like.

EXAMPLES

Examples of the present invention are described below.

Example 1

Platinum particles with an average particle size of about 30 Å were coated with 25 weight percent of acetylene black carbon powder (DENKA BLACK FX-35 made by Denki Kagaku K.K.). This was employed as the cathode catalyst. Platinum-ruthenium alloy (Pt:Ru=1:1 (by weight)) particles with an average particle size of about 30 Å were coated with 25 weight percent of acetylene black carbon powder (DENKA BLACK FX-35 made by Denki Kagaku K.K.). This was employed as the anode catalyst. To isopropanol dispersions of these catalytic powders were admixed ethyl alcohol dispersions of perfluorocarbonsulfonic acid powder (Flemion FSS-1 made by Asahi Glass K.K.) to form pastes. Using these pastes as starting materials, screen printing was conducted to form electrode catalyst layers on one side of nonwoven carbon cloth (TGP-H-090 made by Tore Kogyo K.K.) 250 im in thickness. The quantity of platinum contained in the catalytic layers of the electrodes thus formed was 0.3 mg/cm$^2$, and the quantity of perflurocarbonsulfonic acid was 1.2 mg/cm$^2$.

In these electrodes, the configuration of the cathode and anode was identical with the exception of the catalytic material. These electrodes were bonded to both sides of the center portions of a proton-conducting polymer catalyst film (FAFION 122 made by DuPont of the U.S.) having an area one size larger than the electrodes by hot pressing the printed catalyst layers against the catalyst side. Further, the peripheral portion of the polymer electrolyte membrane exposed around the electrodes was sandwiched between gaskets comprised of sheets of fluorine rubber (Afurasu (registered trademark) made by Asahi Glass K.K.) 250 μm in thickness and hot pressed to integrally bond the assembly. This yielded a membrane electrode assembly (MEA). A 30 μm thin film of perflurocarbonsulfonic acid was employed as the proton-conducting polymer electrolyte membrane.

The electrically conductive separator with the structure described in Implementation Mode 1 was employed in the present embodiment. The figures show a state where a fuel cell, in which this separator is stacked, is positioned in the same manner as in actual operation, with the upward direction being up with respect to gravity. In this electrically conductive separator, gas passages and manifold holes are formed by mechanically processing an isotropic graphite sheet 3 mm in thickness. Gas passages 17 and 28 are 2 mm in groove width and 1 mm in depth, and the passages are spaced 1 mm apart. They are both configured as two-path passages. With the exception that the cooling water passages have a channel depth of 0.5 mm, they are identical to the gas passages. The rated operation conditions of this cell are a fuel use rate of 75 percent, an oxygen use rate of 40 percent, and a current density of 0.3 Å/cm$^2$.

The above-described cell comprised of an MEA sandwiched between a cathode-side separator and an anode-side separator was stacked 50 cells deep. The two separator plates formed cooling water passages between adjacent cells. The cell stack was sandwiched between stainless steel end plates via gold-plated copper current-collecting plates and insulating plates made of polyphenylene sulfide. The two end plates were fastened with fastening rods. The fastening pressure was 10 kgf/cm$^2$ of the area of the electrodes. During operation, the stacked cells were positioned so that the portion of the separator shown in the figures as being on top was on top.

Figure 7:
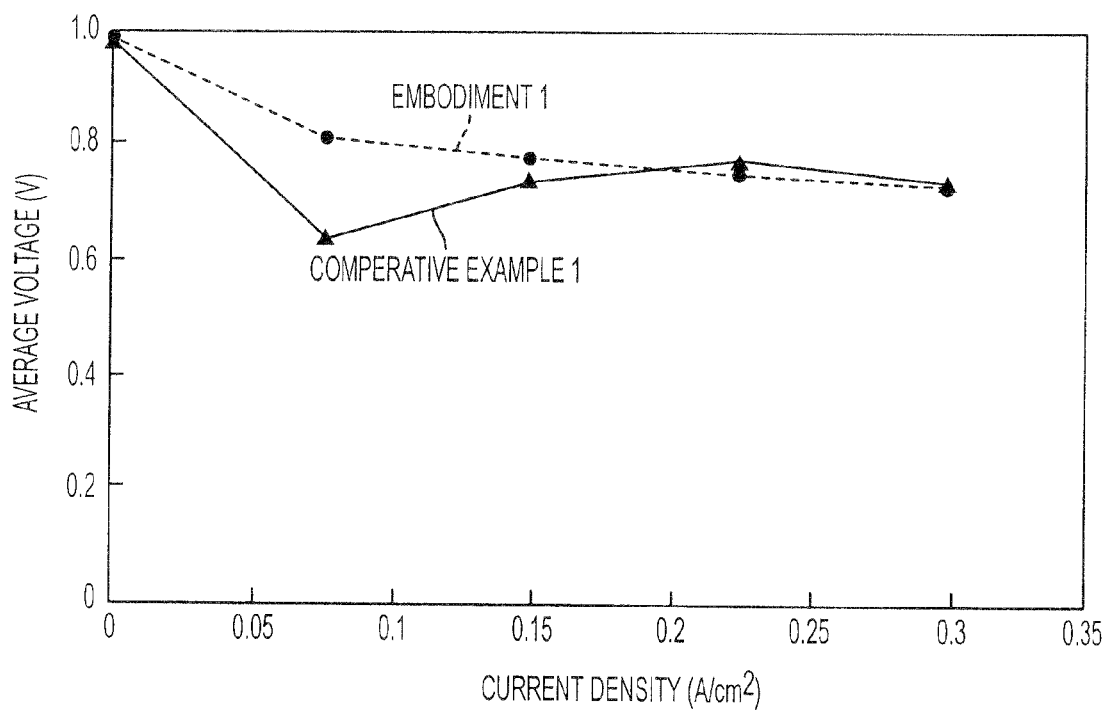
FIG. 7 is a graph of the current-voltage characteristics of the fuel cells of Example 1 and Comparative Example 1 of the present invention.

The fuel cell of the present embodiment thus manufactured was maintained at 70° C., fuel gas (80 percent hydrogen gas/20 percent carbon dioxide/10 ppm carbon monoxide) that had been humidified and heated to impart a dew point of 70° C. was supplied to the anode and air that had been humidified and heated to impart a dew point of 70° C. was supplied to the cathode. This fuel cell was varied from a current density of 0.075 Å/cm$^2$ constituting a low load of 25 percent of rating to a rated load of 0.3 Å/cm$^2$ and the current-voltage characteristics were evaluated. However, the use rates in the testing were made identical to those of rated the conditions. The results are given in FIG. 7. FIG. 7 also includes the characteristics of a comparative example fuel cell. The comparative example fuel cell had cooling water inlets and outlets the reverse of Embodiment 1, with gas being humidified to a relative humidity of 100 percent at the inlet. It will be understood from the figure that the fuel cell of the present embodiment did not undergo flooding and operated stably even in the vicinity of 0.075 Å/cm$^2$ where flooding occurred and operation was difficult due to a decrease in the gas flow speed in the fuel cell of the comparative example. In the present embodiment, the cooling element is located between the anode-side separator and cathode-side separator of adjacent cells. However, the same effect may be achieved by positioning cooling elements between each of multiple cells.

Example 2

In the present embodiment, the separator described in Implementation Mode 2 was employed. The cross-sectional area in the direction of cooling water passage of the constriction was designed to fall within a range of from 1 to 10-fold the sum of the cross-sectional areas of the cooling water passages in all of the cooling surfaces. Since the total cross-sectional area of the two cooling water passages was 4 mm$^2$ in the present embodiment, the cross-sectional area of the construction was designed to fall within a range of 4 to 40 mm$^2$.

Figure 8:
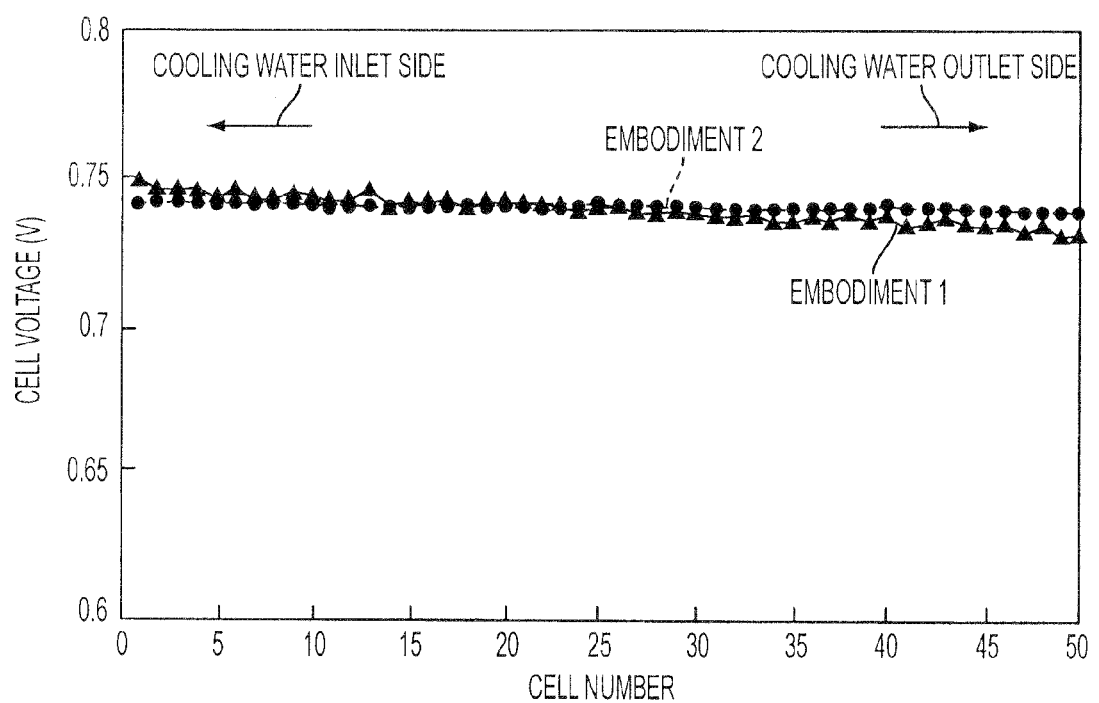
FIG. 8 is a graph showing the relation between cell number and cell voltage in the fuel cells of Examples 1 and 2 of the present invention.
Figure 9:
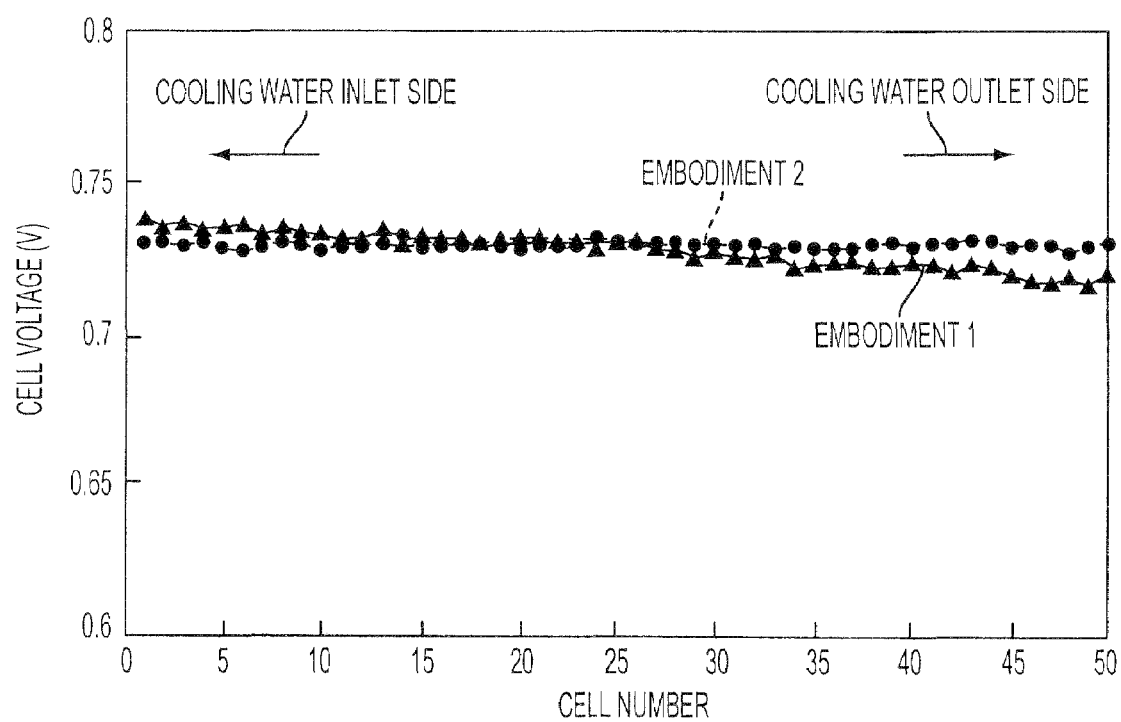
FIG. 9 is a graph showing the relation between the cell number and cell voltage after a durability test of the fuel cells of Examples 1 and 2 of the present invention.

When operating the fuel cell under the operating conditions described in Embodiment 1, the voltage of each cell was measured during rated load operation. The results are given in FIG. 8. FIG. 8 also gives the voltages of individual cells of the fuel cell of Embodiment 1. The configuration here is one where the cooling water is supplied from the number 1 cell side, passes through the manifold and cooling water passages, and is discharged from the number 50 cell side. The fuel cell of Embodiment 1 will be found to have a voltage level that is high on the cooling water inlet side, decreasing as one approaches the outlet. This is because the flow rate of cooling water is nonuniform, producing high and low-temperature cells. By contrast, it will be found that in the fuel cell of the present embodiment, the cooling water is more uniformly distributed, the temperature distribution is uniform, and the cell voltage is rendered uniform. FIG. 9 shows comparison results following operation of these fuel cells for 1,000 hours. FIG. 9 shows that in the cell of Embodiment 1, the rate of deterioration of cell voltage in the vicinity of the cooling water outlet was high, while in the cell of the present embodiment, no sharp deterioration was observed in any of the cells. Cell voltage deterioration is thought to occur because the temperature rises in cells in which the cooling water flow rate decreases, resulting in deterioration due to drying out of the electrolyte membrane. Accordingly, the improved uniformity of cooling water distribution in the present embodiment effectively controlled deterioration of durability.

Example 3

The separator of Implementation Mode 3 was employed in the present Example. The cross-sectional surface area of the constriction on the inlet side of portion 41b communicating with the passage of inlet manifold hole 25B was designed by the same method as in Example 2.

Figure 10:
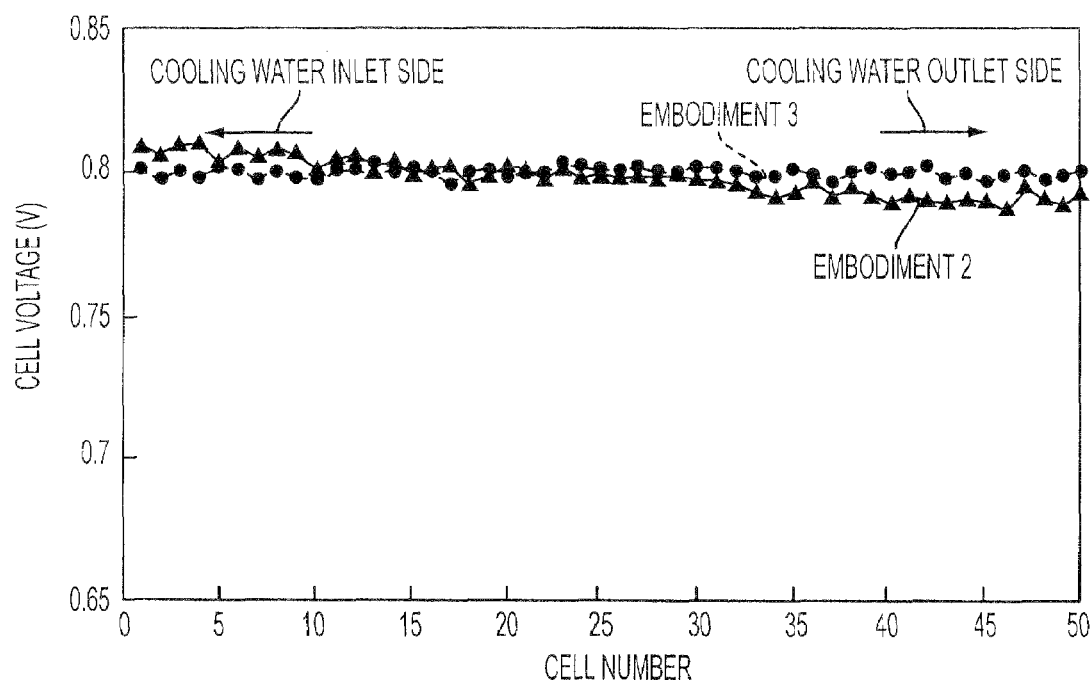
FIG. 10 is a graph showing the relation between the cell number and cell voltage in the fuel cells of Examples 2 and 3 of the present invention.

This fuel cell was operated at ¼ rated load under the operating conditions described in Example 1 and the voltage of each cell was measured when the cooling water was diminished to ¼ of the rated flow rate. The results are given in FIG. 10. FIG. 10 also gives the voltages of the individual cells of the fuel cell described in Example 2. The configuration here is one where cooling water is supplied from the number 1 cell side, passes through the manifold and cooling water passages and is discharged from the number 50 cell side. FIG. 10 reveals that both the cells of Example 2 and the present embodiment were capable of stable operation even at ¼ load. The cell of Example 2 underwent deterioration in uniformity of cooling water distribution when the cooling water flow rate was reduced to ¼ and tended to undergo increased variation in voltage between individual cells. By contrast, the cell of the present embodiment maintained uniform cell voltage despite the decrease in the cooling water flow rate. This was thought to have occurred because cooling water temporarily collected in the first portion 41a on the upstream side in inlet manifold hole 25B, passing via second portion 41b on the downstream side to passage 29, improving the uniformity of distribution when the cooling water flow was low.

Figure 11:
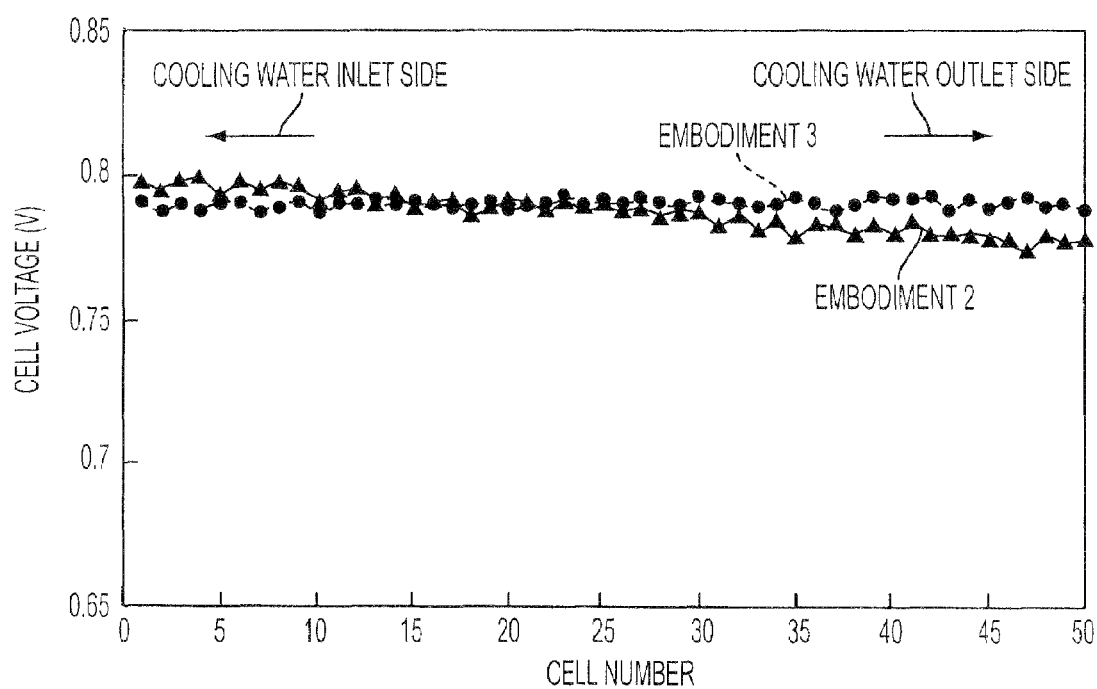
FIG. 11 is a graph showing the relation between the cell number and cell voltage after a durability test of the fuel cells of Examples 2 and 3 of the present invention.

FIG. 11 shows the results of a comparison of voltages between cells after operating the cells for 1,000 hours under low load operating conditions. FIG. 11 reveals that although the cell of Example 2 exhibited a somewhat high rate of deterioration of cell voltage on the cooling water outlet side, the cell of the present embodiment exhibited a uniform decrease in cell voltage. The deterioration in cell voltage was thought to have occurred because the temperature increased in cells with a low cooling water flow rate, causing deterioration due to drying out of the electrolyte membrane. The improved uniformity of distribution of cooling water of the present embodiment was also found to effectively suppress deterioration in durability. In particular, in systems operating for extended periods at a diminished cooling water flow rate during low-load operation, the use of the manifold shape of the present embodiment is effective.

Based on the present invention as set forth above, by causing the oxidizing gas, fuel gas, and cooling water to all flow in a manner not running counter to gravity in the separator, it is possible to promote the smooth discharge of condensation water, achieve stable and efficient operation without causing flooding during low-load operation, eliminate drying out of the electrolyte membrane in the gas inlet portion, and improve durability.

When the cells are stacked, designing a constriction into the cooling water inlet manifold hole permits improved uniformity of cooling water distribution and permits a reduction in the temperature distribution between cells, thus suppressing variation in cell voltage. Further, deterioration in durability is reduced since no cells with high temperatures are produced.

Still further, positioning the connecting member of the communicating member for distributing cooling water from the cooling water inlet manifold hole to the various passages in a higher position with regard to gravity than the position at which cooling water is supplied to the cooling water inlet manifold hole ensures uniform distribution and prevents increased voltage variation due to increased temperature distribution even when the cooling water flow rate has been diminished during low-load operation.

When used in environments where the orientation of the fuel cell assembly may be varied, e.g., in traveling automobiles, it is within the invention to provide apparatus to maintain the appropriate orientation such that the passages previously described do not run counter to gravity.

Based on the description set forth above, numerous improvements and other implementation modes of the present invention will be apparent to those skilled in the art. Accordingly, the above description should be interpreted only by way of example, and has been given with the object of providing those skilled in the art with the best modes of implementing the present invention. To the extent that the spirit of the present invention is not exceeded, the details of these structures and/or functions may be essentially varied.

In the various embodiments illustrated in the drawings, the orientation of the fuel cell has been denoted as "up" and "down" with the flow of liquid being from up towards down.

This application is based on Japanese Patent Application No. 2003-179577 filed on Jun. 24, 2003, the entire technical contents of which are expressly incorporated by reference herein.

The invention claimed is:

1. A polymer electrolyte fuel cell equipped with:
   a cell comprising:
      a membrane electrode assembly (MEA) comprising a hydrogen ion-conducting polymer electrolyte membrane and an anode and a cathode sandwiching the polymer electrolyte membrane;
      a platelike anode-side separator positioned on one side of the MEA so that a front surface thereof contacts the anode, with fuel gas passages through which fuel gas flows being formed in the front surface; and
      a platelike cathode-side separator positioned on the other side of the MEA so that a front surface thereof contacts the cathode, with oxidizing gas passages through which oxidizing gas flows being formed in the front surface;
   a cell stack in which a plurality of said cells is stacked; and
   a cooling water flow passage, through which cooling water flows, formed on at least the rear surface of one from among the anode-side separator and the cathode-side separator of at least a prescribed cell in said cell stack;
   wherein said fuel gas, oxidizing gas, and cooling water flow through said fuel gas passage, oxidizing gas passage, and cooling water passage, respectively, in a manner not running counter to gravity and wherein the separator provided with the cooling water flow passage includes an inlet manifold hole to which an upstream end of the cooling water flow passage is connected and which supplies the cooling water to the cooling water flow passage, the inlet manifold hole runs through said separator in the direction of thickness, and a constriction is provided on the separator so as to be located at the inlet manifold hole.

2. The polymer electrolyte fuel cell of claim 1, wherein the constriction is comprised of a step running in a circumferential direction on the lower portion of the inner circumference surface, with a first portion positioned beneath the step communicating to a cooling water supply pipe and a second portion positioned above the step communicating to the cooling water flow passage.

3. A method of operating a fuel cell comprised of an MEA having a hydrogen ion-conducting polymer electrolyte membrane and an anode and cathode sandwiching the polymer electrolyte membrane comprising:
- providing an anode-side separator positioned on one side of the MEA such that a front surface thereof contacts the anode;
- providing fuel gas passages formed in the front surface;
- providing a cathode-side separator positioned on the other side of the MEA such that a front surface thereof contacts the cathode;
- providing oxidizing gas passages formed in the front surface;
- feeding a moistened fuel gas through said fuel gas passages;
- feeding an oxidizing gas through said oxidizing gas passages;
- reacting said fuel gas and oxidizing gas resulting in the release of heat; said released heat increasing the temperature of the fuel cell;
- passing a cooling fluid comprising water through passages formed on at least the rear surface of one from among the anode-side separator and the cathode-side separator of said cell to absorb at least part of said released heat and hydrate the electrolyte membrane;
- said flowing of said fuel gas and said oxidizing gas being in a direction not counter to gravity from an inlet to an outlet of said fuel gas and said oxidizing gas flow through said cell;
- the separator provided with the cooling water flow passage including an inlet manifold hole to which an upstream end of the cooling water flow passage is connected and which supplies the cooling water to the cooling water flow passage, the inlet manifold hole running through said separator in the direction of thickness;
- providing a constriction on the separator such that said constriction is located at the inlet manifold hole; and
- flowing the cooling fluid through said constriction.

4. The method of claim 3, wherein the constriction is provided in the form of a flow passage interrupted by opposed protrusions.

5. The method of claim 3, wherein the constriction is provided in the form of a step in a flow path of the cooling fluid.

6. The polymer electrolyte fuel cell of claim 1, wherein the constriction is comprised of opposed protrusions in the opposing internal circumference surfaces, with a first portion positioned on one side of the opposed protrusions communicating to a cooling supply pipe and a second portion positioned on the other side of the opposed protrusions communicating to the cooling water flow passage.

7. The polymer electrolyte fuel cell of claim 1, wherein the constriction is provided on the separator such that the constriction makes the inlet manifold hole narrow in a direction of gravity.

8. The method of claim 3, wherein the constriction is provided on the separator such that the constriction makes the inlet manifold hole narrow in a direction of gravity.

* * * * *